United States Patent
Mitobe et al.

(10) Patent No.: US 8,305,624 B2
(45) Date of Patent: Nov. 6, 2012

(54) IMAGE FORMATION SYSTEM, IMAGE FORMATION PROGRAM RECORDING MEDIUM, AND IMAGE FORMATION METHOD

(75) Inventors: Yasuaki Mitobe, Kanagawa (JP); Yoshihiro Ohshima, Kanagawa (JP); Yukiharu Inoue, Kanagawa (JP); Yoshinori Awata, Kanagawa (JP); Kazuya Hashimoto, Kanagawa (JP); Fumio Takatani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1204 days.

(21) Appl. No.: 12/104,559

(22) Filed: Apr. 17, 2008

(65) Prior Publication Data

US 2009/0086224 A1    Apr. 2, 2009

(30) Foreign Application Priority Data

Sep. 28, 2007   (JP) ................................ 2007-255371

(51) Int. Cl.
- G06K 15/00   (2006.01)
- G06F 15/00   (2006.01)
- G06K 1/00    (2006.01)
- H04N 1/46    (2006.01)
- G03F 3/08    (2006.01)

(52) U.S. Cl. ....... 358/1.16; 358/1.17; 358/1.9; 358/515; 358/518; 358/524

(58) Field of Classification Search .................. None
See application file for complete search history.

(56) References Cited

U.S. PATENT DOCUMENTS

| | | | | |
|---|---|---|---|---|
| 5,923,825 A | * | 7/1999 | Orlicki et al. | 358/1.12 |
| 5,930,464 A | * | 7/1999 | Nakayama et al. | 358/1.15 |
| 5,963,713 A | * | 10/1999 | Inose et al. | 358/1.4 |
| 6,542,633 B1 | * | 4/2003 | Kori | 382/167 |

(Continued)

FOREIGN PATENT DOCUMENTS

JP           3061056          3/1991

(Continued)

OTHER PUBLICATIONS

Office Action issued on Sep. 29, 2009 from the Japanese Patent Office in corresponding Japanese Patent Application No. 2007-255371, with English translation.

*Primary Examiner* — Satwant Singh
(74) *Attorney, Agent, or Firm* — Gesmer Updegrove LLP (57) ABSTRACT

An image formation system includes I storage units, an assignment unit that assigns to the storage units storage destinations of color component data forming a part of image data, J color component image formation units that form color component images of corresponding colors based on color component data stored in the storage units, and an image formation unit that forms an image of the image data based on the formed color component image, wherein the assignment unit includes a J-color assignment unit that assigns to the I storage units storage destinations of J sets of color component data forming a part of J-color image data, and an L-color assignment unit that assigns a storage destination of L sets of color component data forming a part of L-color image data to N storage units among the I storage units, and each of I, J, and N is a natural number greater than or equal to 2, L is a natural number greater than or equal to 1, L<J, and L<N≦I.

23 Claims, 7 Drawing Sheets

U.S. PATENT DOCUMENTS

| | | | |
|---|---|---|---|
| 2003/0151770 A1* | 8/2003 | Yamazaki | 358/1.17 |
| 2003/0184774 A1* | 10/2003 | Minowa | 358/1.9 |
| 2003/0193535 A1* | 10/2003 | Nakayama et al. | 347/5 |
| 2006/0279814 A1* | 12/2006 | Fukada et al. | 358/540 |
| 2007/0047032 A1* | 3/2007 | Kondo | 358/518 |
| 2007/0188775 A1* | 8/2007 | Minamino | 358/1.6 |
| 2007/0211270 A1* | 9/2007 | Kuwahara et al. | 358/1.9 |
| 2009/0073466 A1* | 3/2009 | Awata et al. | 358/1.9 |
| 2011/0149318 A1* | 6/2011 | Fukada et al. | 358/1.9 |

FOREIGN PATENT DOCUMENTS

| | | |
|---|---|---|
| JP | 3153161 | 7/1991 |
| JP | 11008776 | 1/1999 |
| JP | 2000134478 | 5/2000 |
| JP | 200138954 | 2/2001 |
| JP | 2004287520 | 10/2004 |

* cited by examiner

IMAGE FORMATION SYSTEM, IMAGE FORMATION PROGRAM RECORDING MEDIUM, AND IMAGE FORMATION METHOD

CROSS-REFERENCE TO RELATED APPLICATIONS

This application is based on and claims priority under 35 USC 119 from Japanese Patent Application No. 2007-255371, filed on Sep. 28, 2007.

BACKGROUND

1. Technical Field

The present invention relates to an image formation system, an image formation program, and an image formation method.

2. Related Art

In a known technique, image data of respective colors corresponding to image formation devices are transmitted from a storage device and an image is formed.

SUMMARY

According to one aspect of the invention, there is provided an image formation system including I storage units, an assignment unit that assigns to the respective storage units storage destinations of sets of color component data each forming a part of image data, J color component image formation units that form color component images of corresponding colors based on color component data stored in the storage units, and an image formation unit that forms an image of the image data based on the formed color component image, wherein the assignment unit includes a J-color assignment unit that assigns storage destinations of J sets of color component data forming a part of J-color image data to the I storage units, and an L-color assignment unit that assigns storage destinations of L sets of color component data forming a part of L-color image data to N storage units among the I storage units, and each of I, J, and N is a natural number greater than or equal to 2, L is a natural number greater than or equal to 1, $L<J$, and $L<N \leqq I$.

BRIEF DESCRIPTION OF THE DRAWINGS

Exemplary embodiment(s) of the present invention will be described by reference to the following figures, wherein.

DETAILED DESCRIPTION

[Explanation of Terms and Concepts]

An image formation system is a device having computer hardware components such as a calculation circuit, a storage circuit, and an image formation device. All of the computer hardware components may be stored in a common housing, or the computer hardware components may be stored in multiple housings and may be set to be able to communicate with each other. In the image formation system, typically, operations such as a calculation process operation and an image formation operation are defined by a program which controls the computer hardware. The program may be installed in the image formation system in advance, or, alternatively, the program may be provided through a recording medium such as a CD and a DYD or through a network.

A storage unit is constructed using a storage device such as a semiconductor memory and stores color component data. I storage units may be prepared to be physically separated or physically integral. The storage unit is constructed to enable at least independent control of the inputs and outputs of data.

The image data are data which represent an image which is to be formed (which represents a target pattern of the image formation and includes, for example, a text, a drawing, and a photograph). The format of the data is not particularly limited, and may be, for example, a raster format or a vector format, and may be compressed. The image data are constructed using one set of color component data or two or more sets of color component data. The color component data may be data which represent presence/absence of the color or data which represent density of the color. In a single set of color image data including a color component of a single color, normally, the data are constructed using one set of color component data, and, in multiple color image data including color components of multiple colors, normally, the data are constructed using color component data of multiple colors. Examples of color components of multiple colors include a 4-color component of C (Cyan), M (Magenta), Y (Yellow), and K (Black).

An assignment unit is a unit which assigns a storage destination of each set of color component data to a storage unit, and includes a J-color assignment unit which assigns storage destinations of J sets of color component data forming a part of J-color image data to I storage units, and an L-color assignment unit which assigns to N storage units storage destinations of L sets of color component data forming a part of L-color image data. The assignment is typically executed for each unit of processing of the image formation by a color component image formation unit or for each unit of reading color component data. Examples of the units include one scan line, multiple scan lines, one page of paper, and one file. Typically, assignment with fixed storage destination is executed in the J-color assignment and dynamic assignment in which the storage destination is determined according to the situation is executed in the L-color assignment unit. However, this need not be the case, and dynamic assignment may be executed also in the J-color assignment unit. When N is not equal to I (N≠I), the N storage units to be selected from among the I storage units may be fixed or may be changed (furthermore, the change may be dynamic).

The dynamic assignment is executed on the basis of, for example, an empty capacity of the N image storage units. A region in which the color component data are not stored and a region in which color component data for which processing by the color component image formation unit is completed are stored are regions which can store the next set of color component data, and an empty capacity can be determined. As a concrete example, there may be employed a configuration in which assignment is executed such that the empty capacities of the storage units are evened. The dynamic assignment may alternatively be executed on the basis of a capacity (size) of the color component data.

The color component image formation unit forms a color component image having a corresponding color based on color component data stored in the storage unit. Typically, one color component image formation unit forms a color component image based on one set of color component data, but may form a color component image based on multiple sets of color component data such as in a case where a complementary color is utilized. Examples of a method of forming the color component image include an electrophotography method and an inkjet method. The image formation unit forms an image of image data based on each formed color component image. Examples of the image formation unit include a mechanism which positions the color component images formed on a transfer structure (such as a transfer belt or a transfer roll) and paper and combines the color component images.

If the processes of the color component image formation unit (and image formation unit) are executed at a relatively high speed, the image of the color component data stored in the storage is quickly formed. In particular, when the color component data are written to the storage unit at a relatively low speed, the process of the color component image formation unit is clogged. Therefore, the L-color assignment unit executes the assignment process so that many sets of color component data are stored in the storage units.

A switching unit switches a connection between the storage unit and the color component image formation unit so that the color component image formation unit can refer to suitable color data. The switching unit is realized, for example, by a switching hub.

Each of I, J, and N is a natural number of 2 or greater, L is a natural number of 1 or greater, L<J, and L<N≦I. I and J may be set equal to each other (I=J) or may be set to differ from each other (I≠J). When N is set to I (N=I), all storage units are used by the L-color assignment unit. When L is 1 (L=1), the L-color assignment unit uses two or more storage units for formation of a single color image (normally, a black-and-white image).

[Exemplary Embodiment]

An exemplary embodiment of the present invention will now be described.

Figure 1A:
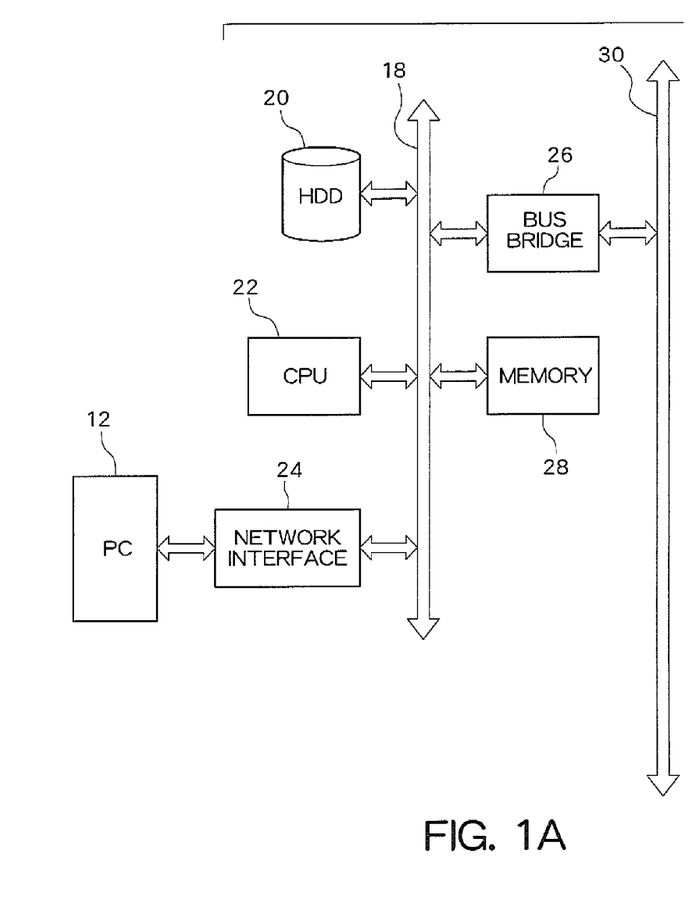
FIGS. 1A and 1B are diagrams for explaining an example structure of a system.
Figure 1B:
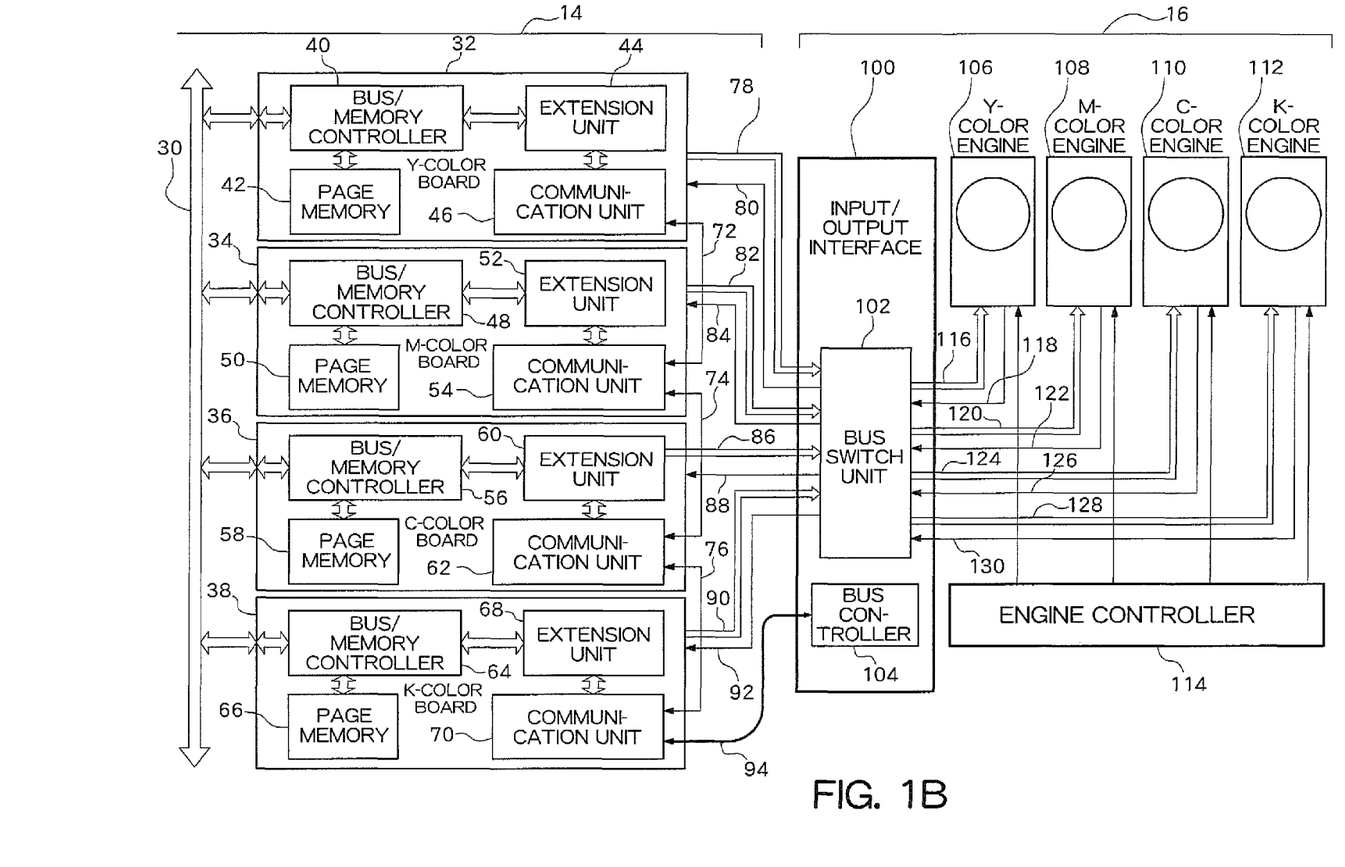

FIGS. 1A and 1B are diagrams for explaining a schematic structure of a system having a print system 10 and a PC (Personal Computer) 12. The print system 10 is an example image formation system which can form an image based on four color components of CMYK, and includes a print server 14 and a printer 16. The PC 12 is connected to the print system 10 through a network such as the Internet. A user instructs execution of printing to the print system 10 from the PC 12 or the like.

The print server 14 is constructed from computer hardware such as a PC. In the print server 14, a bus 18 is provided as an internal communication path, and an HDD (Hard Disk Drive) 20, a CPU (Central Processing Unit) 22, a network interface 24, a bus bridge 26, a memory 28, and the like are provided on the bus 18. The HDD 20 is a large-capacity storage device having a magnetic disk and is used for storage of image data or the like. The CPU 22 is a device having a calculation circuit and controls each constituent element of the print server 14 and executes the conversion process or processing of the image data on the basis of a program. For example, when postscript data which are image data in a vector format are transmitted from the PC 12 and printing is instructed, the CPU 22 converts the data into raster data, executes a compression process, and sends the compressed data to the bus bridge 26. The network interface 24 is a device for communicating with an external device such as the PC 12 through the network. The bus bridge 26 controls communication between the bus 18 and a bus 30 to be described later. The memory 28 is a storage device which uses a semiconductor storage element. The memory 28 stores the program for controlling the CPU 22 and image data to be processed by the CPU 22.

In the print server 14, the bus 30, which is different from the bus 18, is also provided. The bus 30 is connected to the bus 18 through the bus bridge 26. On the bus 30, a Y-color board 32, an M-color board 34, a C-color board 36, and a K-color board 38, which are hardware components specialized in image processes, are provided.

The Y-color board 32 is given this name because the Y-color board 32 executes a process with respect to Y-color component data, which are a Y-color component of the image data when color printing of 4 colors of YMCK is executed. As will be described later, the Y-color board 32 is also used for black-and-white printing.

On the Y-color board 32, a bus/memory controller 40, a page memory 42, an extension unit 44, and a communication unit 46 are provided. The bus/memory controller 40 controls input of data from the bus 30 and input and output of data to and from the page memory 42. The page memory 42 is an example of a storage unit, and stores color component data of a color image and black-and-white image data (which may be considered color component data of one color) in units of pages. The extension unit 44 extends the color component data compressed by the CPU 22, and includes a circuit (hardware) for the extension process. The communication unit 46 is a device having a calculation function, and is controlled by a program. The communication unit 46 controls the output of the color component data from the extension unit 44. For this purpose, the communication unit 46 adjusts the output timing by receiving an input of a timing signal from the printer 16 and notifies the input state of the color component data to the communication unit of the board of another color through a data signal line 72.

Similar to the Y-color board 32, the M-color board 34 is provided with a bus/memory controller 48, a page memory 50, an extension unit 52, and a communication unit 54; the C-color board 36 is provided with a bus/memory controller 56, a page memory 58, an extension unit 60, and a communication unit 62; and the K-color board 38 is provided with a bus/memory controller 64, a page memory 66, an extension unit 68, and a communication unit 70. The communication units 46, 54, 62, and 70 of the boards can communicate through data signal lines 72, 74, and 76. For example, when color component data of an amount which can be processed for printing (for example, one page) are stored in the page memory of a board, the communication unit collects this information in the communication unit 70 through the corresponding data signal line.

The color boards and the printer 16 are connected by a bus cable. The bus cable includes a data signal line 78 for transmitting the Y-color component data which is output from the Y-color board 32, and a data signal line 80 for transmitting a timing signal which is input to the Y-color board 32. Similarly, the bus cable includes a data signal line 82 for transmitting the M-color component data which is output from the M-color board 34, a data signal line 84 for transmitting a timing signal which is input to the M-color board 34, a data signal line 86 for transmitting the C-color component data which is output from the C-color board 36, a data signal line 88 for transmitting a timing signal which is input to the C-color board 36, a data signal line 90 for transmitting the K-color component data which is output from the K-color board 38, and a data signal line 92 for transmitting a timing signal which is input to the K-color board 38. In addition, a data signal line 94 for transmitting a storage state of the color component data to the printer 16 extends from the communication unit 70.

The printer 16 includes an input/output interface 100, a Y-color engine 106, an M-color engine 108, a C-color engine 110, a K-color engine 112, and an engine controller 114. The input/output interface 100 is a device which controls input and output of data between the print server 14 and the printer 16, and includes a bus switch unit 102 and a bus controller 104. The bus switch unit 102 is an example of a switching unit. To the bus switch unit 102, a bus cable from the print server 14 is connected, and, in addition, there are connected a data signal line 116 for transmitting the color component data which is input to the Y-color engine 106, a data signal line 118 for transmitting a timing signal which is output from the Y-color engine 106, a data signal line 120 for transmitting the color component data which is input to the M-color engine 108, a data signal line 122 for transmitting a timing signal which is output from the M-color engine 108, a data signal line 124 for transmitting the color component data which is input to the C-color engine 110, a data signal line 126 for transmitting a timing signal which is output from the C-color engine 110, a data signal line 128 for transmitting the color component data which is input to the K-color engine 112, and a data signal line 130 for transmitting a timing signal which is output from the K-color engine 112. In the bus switch unit 102, states of connections between the data signal lines 78, 82, 86, and 90 for transmitting the color component data which are output from the color boards and the data signal lines 116, 120, 124, and 128 for transmitting the color component data which are input to the engines are switched, so that the flow of the color component data is controlled. In addition, in the bus switch unit 102, the states of connections between the data signal lines 118, 122, 126, and 130 for transmitting the timing signals which are output from the engines and the data signal lines 80, 84, 88, and 92 for transmitting the timing signals which are input to the boards are switched, so that the flow of the timing signals is controlled.

The bus controller 104 is a device which has a calculation function and which is controlled by a program, and instructs the bus switch unit 102 as to how the connection states are to be switched. For this purpose, the bus controller 104 is connected to the communication unit 70, and there is input information such as information indicating whether printing of color image data is to be executed or printing of black-and-white image data is to be executed (and information, in the case of the black-and-white image data, of the order of the color component data in the page memories of the color boards as necessary), as well as information indicating whether or not input, to the page memory, of the color component data to be next printed is completed (in other words, a status signal indicating whether or not preparation of an output in the printer 16 is completed). The bus controller 104 transmits notification to the engine controller 114 that preparation of the output of the color component data is completed and instructs the bus switch unit 102 to switch the connection state according to a correspondence relationship between the page memory and the color component data.

The Y-color engine 106 is an example of a color component image formation unit of Y color, and is a device which forms a latent image on a photosensitive drum based on input color component data of the Y color and develops an image with a toner of the Y color. Similarly, the M-color engine 108 is a device which forms a latent image on a photosensitive drum based on input color component data of the M color and develops an image with a toner of the M color, the C-color engine 110 is a device which forms a latent image on a photosensitive drum based on input color component data of the C color and develops an image with a toner of the C color, and the K-color engine 112 is a device which forms a latent image on a photosensitive drum based on input color component data of the K color and develops an image with a toner of the K color. When the engine receives from the engine controller 114 information that input of the color component data is enabled, the engine outputs a timing signal for instructing an input timing of the color component data and receives input of the corresponding color component data. The color component images formed at the engines are combined on a transfer belt and the combined image is further transferred onto paper. This overall structure is an example of the image formation unit. The engine controller 114 is a device which has a calculation function and executes the above-described control according to a program.

Figure 2:
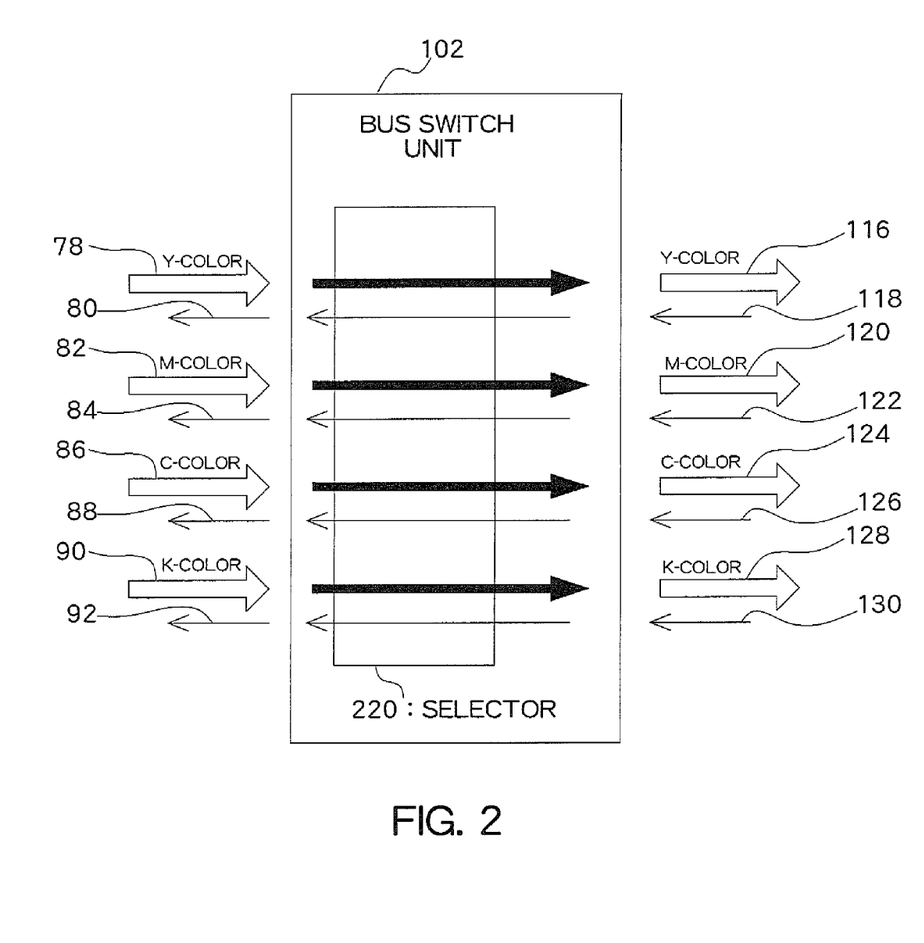
FIG. 2 is a diagram showing an example of switching between a color board and a color engine.

Next, an operation of the bus switch unit 102 will be described with reference to FIGS. 2 and 3. FIG. 2 shows an example case in which image data including color component data of 4 colors of CMYK are processed. For such color image data, the bus/memory controller of each of the boards of CMYK receives input of the color component data of the corresponding color and stores the color component data in the page memory. When the bus controller 104 receives a notification from the communication unit 70 that the storage of the color component data to the page memory is completed, the bus controller 104 instructs a selector (selection circuit) 220 of the bus switch unit 102 to switch to the connection state shown in FIG. 2. That is, switching is executed such that the data signal lines 78-92 are connected to the data signal lines 116-130 in this order. In this manner, the timing signal which is output from each engine is transmitted to the communication unit of the board storing the corresponding color component data, and the communication unit outputs the color component data. The color component data are then input to the engine of the corresponding color.

Figure 3:
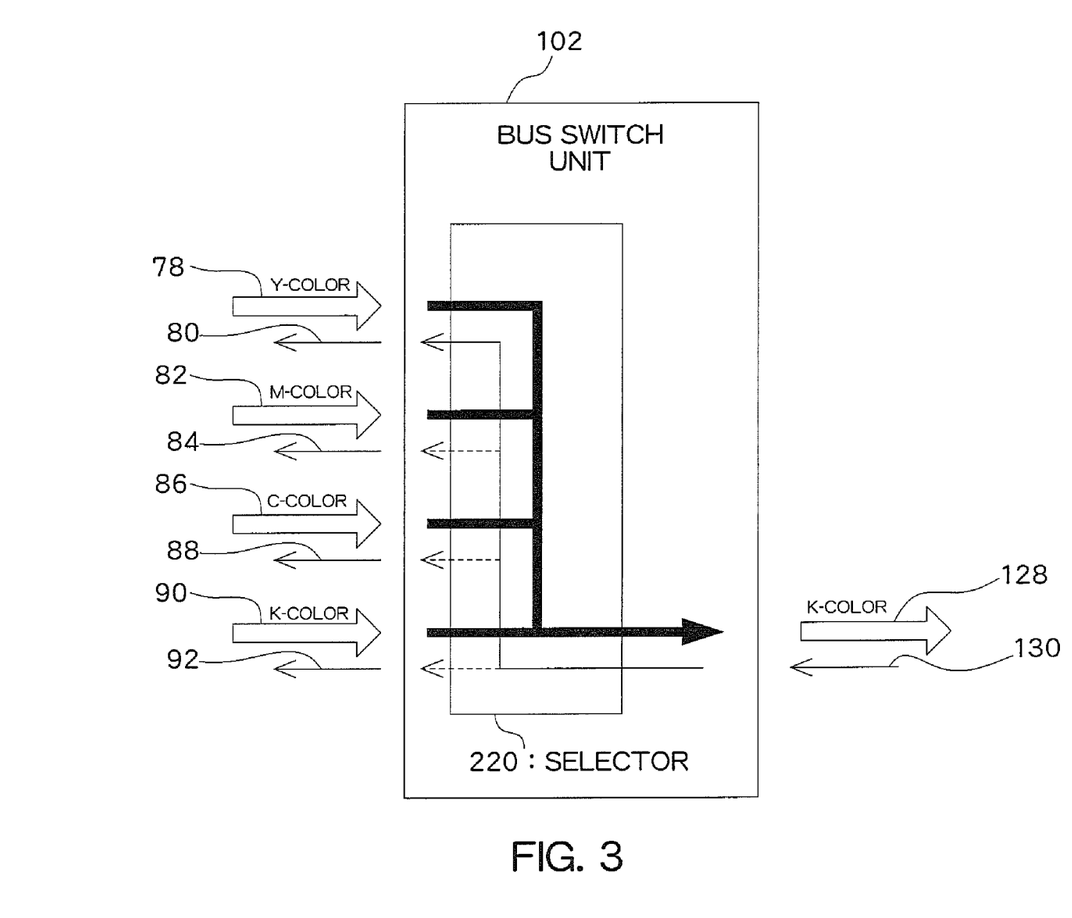
FIG. 3 is a diagram showing another example of switching between a color board and a color engine.

FIG. 3 shows an example case in which black-and-white image data including color component data of one color are processed. When the black-and-white image data have a length of multiple pages, the color component data of each page are assigned to the respective boards of YMCK according to a suitable rule. The bus/memory controller of each of the boards of YMCK receives input of the color component data of the assigned page and stores the color component data in the page memory. When the bus controller 104 receives from the communication unit 70 a notification indicating that the storage of the color component data to the page memory is completed, the bus controller 104 instructs the selector 220 of the bus switch unit 102 to switch to the connection state as shown in FIG. 3. In other words, the data signal lines 78, 82, 86, and 90 are connected to the data signal line 128, and the data signal lines 80, 84, 88, and 92 are sequentially connected to the data signal line 130 at the output timings of the color component data. In this manner, the timing signal which is output from the K-color engine 112 is transmitted to the communication unit of the board storing the color component data for which the color component image formation is to be started. The color component data which are output from the communication unit are input to the K-color engine 112.

Next, configurations of the assignment of the color component data to the boards will be described with reference to FIGS. 4-6.

Figure 4:
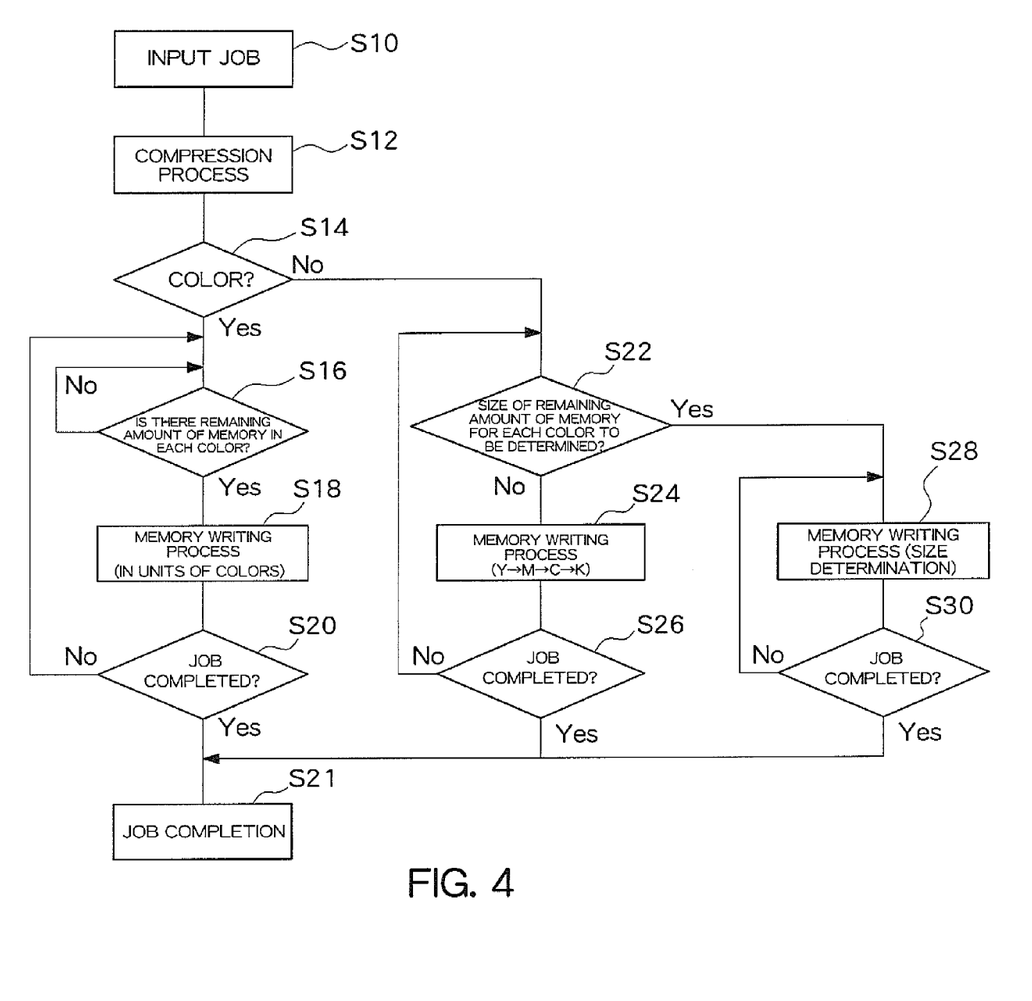
FIG. 4 is a flowchart showing an example assignment process of a color board to be set as a storage destination.

FIG. 4 is a flowchart for explaining a flow of a process in the print server 14. When a job is input to the print server 14 by, for example, an input of a print instruction from the PC 12 or the like along with image data (S10), the CPU 22 converts the image data into a raster format when the image data are in a non-raster format. The CPU 22 then executes a compression process on the image data of the raster format (S12). During this process, the CPU 22 determines whether the image data are color data or black-and-white data (S14). When it is determined that the image data are color data, the corresponding color component data are output to the boards. The bus/memory controller of each board determines whether or not there is a sufficient empty capacity (remaining amount) in the page memory for storing the color component data (S16), and, executes a writing process when sufficient empty capacity becomes available (s18). Then, it is determined whether or not the job is completed; that is, it is determined whether or not writing of all pages is completed (S20). When it is determined that the job is not completed, the processes from step S16 are repeated. The page memory normally has a capacity to a degree to allow storage of color component data of multiple pages (for example, 128 MByte). Because of this, if there is a remaining amount of memory, the color component data are consecutively stored. The color component data are deleted or set to a rewritable state when the output to the printer 16 is completed so that a new empty capacity is secured. When, on the other hand, it is determined in step S20 that the job is completed, the job is completed (S21).

When, on the other hand, it is determined in step S14 that the data are black-and-white data, a determination is made as to whether or not a process according to a size determination of the remaining amount of memory of each color is set (S22). When no such process is set, the writing process to the page memory is repeated in the order of YMCK (S24). When there is no sufficient remaining amount of memory in the page memory to be written, the system transitions to a wait state until an empty capacity becomes available, similar to step S16. The following steps of determining whether or not the job is completed (S26) and repeating the processes or determining that the job is completed (S21) are similar to step S20.

If it is determined in step S22 that there is a setting for executing size determination of the remaining amount of memory in each color, the writing process of the color component data is executed in the order from a larger remaining amount in the page memory to a smaller remaining amount in the page memory among the boards of YMCK (S28). The control of flow through determination of the job completion (S30) is similar to steps S20 and S26.

Figure 5:
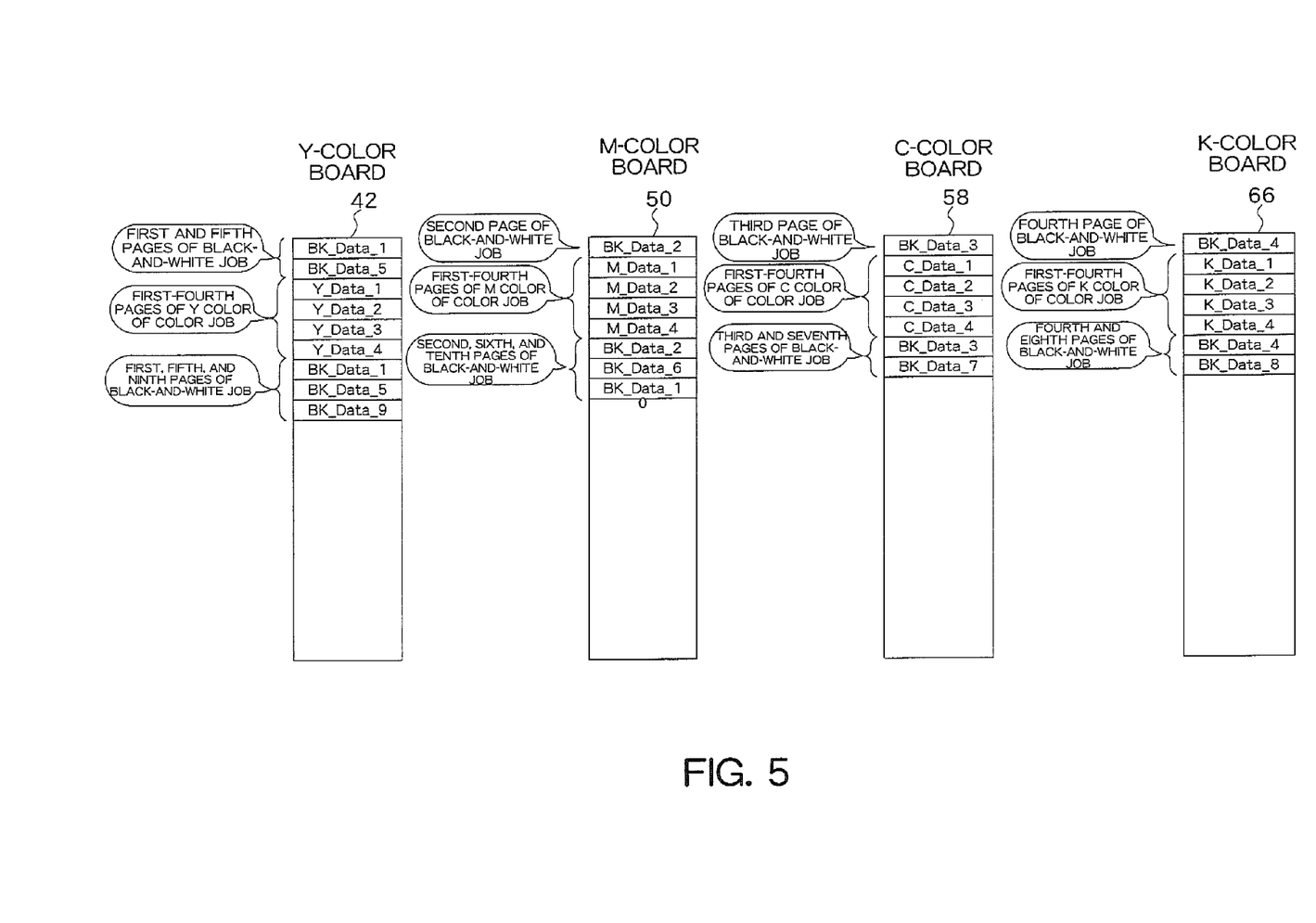
FIG. 5 is a diagram showing an example assignment configuration of a color board to be set as a storage destination.

FIG. 5 is a diagram for explaining assignment and storage of image data to the page memory 42 of the Y-color board 32, the page memory 50 of the M-color board 34, the page memory 58 of the C-color board 36, and the page memory 66 of the K-color board 38. In this example configuration, the writing process in step S24 in FIG. 4 is executed. In other words, the monochrome data is assigned to the storage destination in the order of YMCK regardless of the size of the remaining amount of memory.

In the configuration shown in FIG. 5, first, a job for black-and-white image data of 5 pages is started, and the data of the pages (BK_Data_1-BK_Data_5) are stored in the page memories in the order of YMCKY. Next, color image data of four pages are stored. In this case, each set of color component data is stored in the page memory of the corresponding color board such as, for example, the Y-color component data being stored in the page memory 42 of the Y-color board. Therefore, first, first pages of the corresponding color component data (Y_Data_1, M_Data_1, C_Data_1, K_Data_1) are stored in the page memories 42-66. Then, the color component data of second-fourth pages are sequentially stored. In this manner, at the end, the Y-color component data of first-fourth pages (Y_Data_1-Y_Data_4) are stored in the page memory 42 of the Y-color board 32, the M-color component data of first-fourth pages (M_Data_1-M_Data_4) are stored in the page memory 50 of the M-color board 34, the C-color component data of the first-fourth pages (C_Data_1-C_Data_4) are stored in the page memory 58 of the C-color board 36, and the K-color component data of first-fourth pages (K_Data_1-K_Data_4) are stored in the page memory 66 of the K-color board 38.

Next, black-and-white image data of 10 pages are stored. In this case, because the data are stored in the order of YMCK, the first, fifth, and ninth pages (BK_Data_1, BK_Data_5, BK_Data_9) are assigned to the page memory 42 of the Y-color board 32, the second, sixth, and tenth pages (BK_Data_2, BK_Data_6, BK_Data_10) are assigned to the page memory 50 of the M-color board 34, the third and seventh pages (BK_Data_3, BK_Data_7) are assigned to the page memory 58 of the C-color board 36, and the fourth and eighth pages (BK_Data_4, BK_Data_8) are assigned to the page memory 66 of the K-color board 38.

Here, because the black-and-white image data are always input in an order from the Y-color board, there is a tendency that the remaining amount of the page memory 42 of the Y-color board always becomes smaller than the remaining amounts of the page memories of the other color boards. In order to resolve this, there may be employed a configuration in which the data is assigned with higher priority to the page memory having the most remaining amount (least usage ratio).

Figure 6:
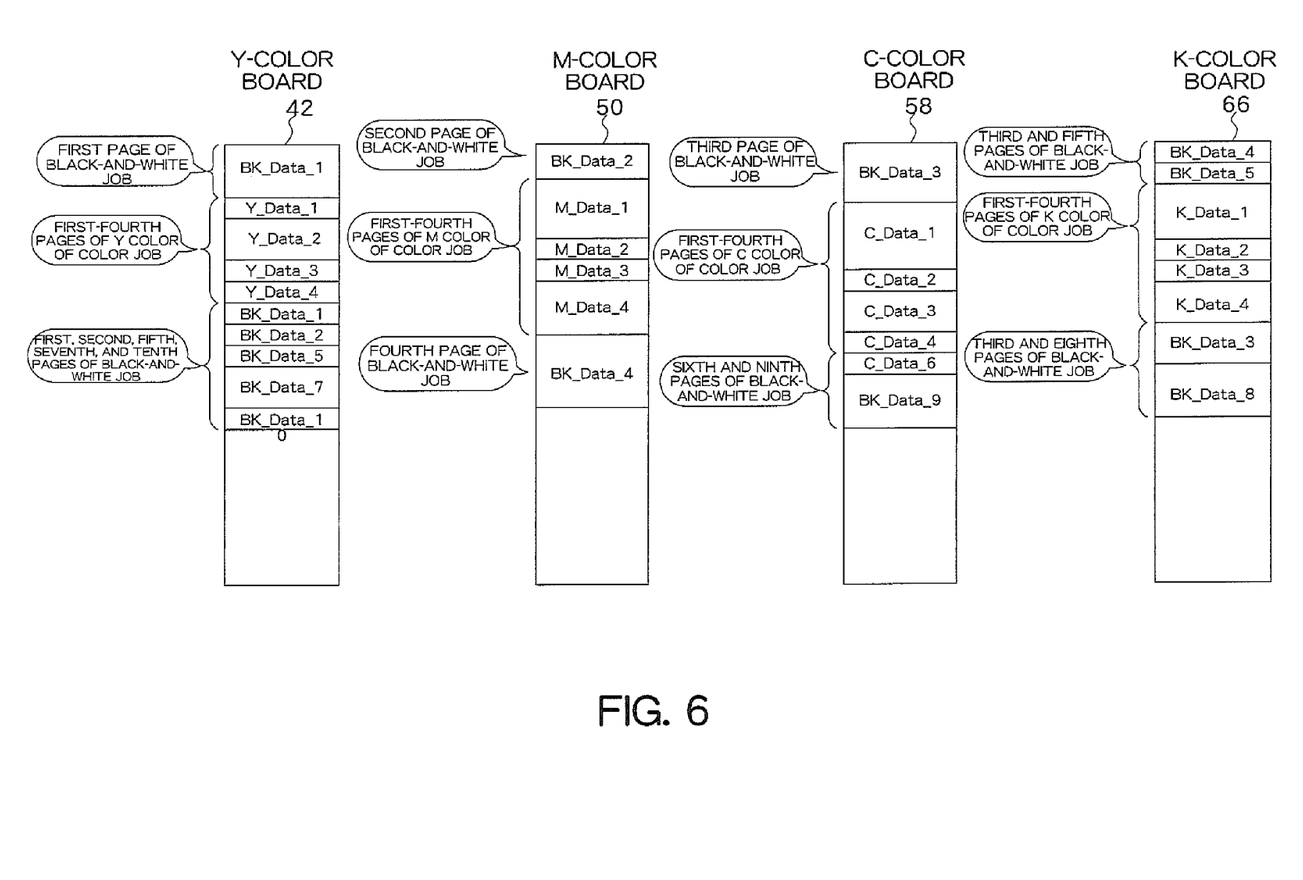
FIG. 6 is a diagram showing another example assignment configuration of a color board to be set as a storage destination.

FIG. 6 shows an example case in which the image data are stored so that the remaining amounts (usage ratio) of the page memories are evened, in order to store a larger amount of image data. This corresponds to the process of S28 in FIG. 4.

In this configuration, first, printing for black-and-white image data of 5 pages is instructed. The first-fourth pages (BK_Data_1-BK_Data_4) are stored in the order of YMCK. The size of the image data (which is represented in FIG. 6 by the area of the image data) is not uniform, because of a difference in the compression ratio or of a difference in the size of the print paper, and the page memory 66 of the K-color board 38 has the largest remaining amount of memory at the point of storage of the data of first-fourth pages. Therefore, the data of the fifth page (BK_Data_5) are stored in the page memory 66. Next, color image data of four pages are stored. In this process, similar to the example configuration of FIG. 5, the color component data are stored in the page memories of the corresponding color boards.

Next, each page of 10 pages of black-and-white image data is sequentially stored in the page memory having the largest remaining amount of memory at the time of storage. For example, the storage destination of the data of the first page (BK_Data_1) is assigned to the page memory 66 of the Y-color board 38 having the largest remaining amount of memory at this point. By repeating this process, in the example configuration shown in FIG. 6, the first, second, fifth, seventh, and tenth pages (BK_Data_1, BK_Data_2, BK_Data_5, BK_Data_7, BK_Data_10) are assigned to the page memory 42 of the Y-color board 32, the fourth page (BK_Data_4) is assigned to the page memory 50 of the M-color board 34, the sixth and ninth pages (BK_Data_6, BK_Data_9) are assigned to the page memory 58 of the C-color board 36, and the third and eighth pages (BK_Data_3, BK_Data_8) are assigned to the page memory 66 of the K-color board 38.

Above, there is described a configuration in which the print system 10 has four (I=4) page memories (storage units) and four (J=4) engines (color component image formation units) The color component data forming a part of the color image data of four colors are assigned to four page memories, and color component data forming a part of black-and-white image data of one color (L=1) are assigned to four (N=4) page memories. The exemplary embodiment, however, may be applied to configurations with different values for I, J, L, and N.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image formation system comprising:
    I storage units;
    an assignment unit that assigns storage destinations of color component data forming a part of image data to the respective storage units;
    J color component image formation units that form color component images of corresponding colors based on color component data stored in the storage units; and
    an image formation unit that forms an image of the image data based on the formed color component image, wherein the assignment unit comprises a J-color assignment unit that assigns storage destinations of J sets of color component data forming a part of J-color image data to the I storage units and an L-color assignment unit that assigns a storage destination of L sets of color component data forming a part of L-color image data to N storage units among the I storage units, and each of I, J, and N is a natural number greater than or equal to 2, L is a natural number greater than or equal to 1, L<J, and L<N≦I;
    said assignment unit assigning the image data of one color which is included in the J-color image data or the L-color image data and which is determined in advance, to the plurality of storage units.

2. The image formation system according to claim 1, wherein the L-color assignment unit dynamically assigns the storage destination of the L sets of color component data to the N storage units.

3. The image formation system according to claim 1, wherein the L-color assignment unit assigns the storage destinations of the L sets of color component data based on an empty capacity of the N storage units.

4. The image formation system according to claim 2, wherein the L-color assignment unit assigns the storage destinations of the L sets of color component data based on an empty capacity of the N storage units.

5. The image formation system according to claim 3, wherein the L-color assignment unit assigns the storage destinations of the L sets of color component data for each processing unit for which the color component image formation unit executes an image formation process.

6. The image formation system according to claim 4, wherein the L-color assignment unit assigns the storage destinations of the L sets of color component data for each processing unit for which the color component image formation unit executes an image formation process.

7. The image formation system according to claim 1, further comprising a switching unit that switches a connection between the storage unit and the respective color component image formation unit according to an assignment by the assignment unit.

8. The image formation system according to claim 1, wherein N is I.

9. The image formation system according to claim 1, wherein L is 1.

10. A non-transitory computer-readable medium storing a program causing a computer which has I storage units to execute a process for image formation, the process comprising:
    assigning to respective storage units storage destinations of color component data forming a part of image data;
    forming J color component images of corresponding colors based on color component data stored in the storage units;
    forming an image of the image data based on the formed color component image, wherein in the assignment, storage destinations of J sets of color component data forming a part of J-color image data are assigned to the I storage units and a storage destination of L sets of color component data forming a part of L-color image data are assigned to N storage units among the I storage units, and each of I, J, and N is a natural number greater than or equal to 2, L is a natural number greater than or equal to 1, L<J, and L<N≦I; and
    assigning the image data of one color which is included in the J-color image data or the L-color image data and which is determined in advance, to the plurality of storage units.

11. The non-transitory computer-readable medium according to claim 10, wherein in the assignment of the L sets of color component data, the storage destinations of the L sets of color component data are dynamically assigned to the N storage units.

12. The non-transitory computer-readable medium according to claim 10, wherein in the assignment of the L sets of color component data, the storage destinations of the L sets of color component data are assigned based on an empty capacity of the N storage units.

13. The non-transitory computer-readable medium according to claim 11, wherein in the assignment of the L sets of color component data, the storage destinations of the L sets of color component data are assigned based on an empty capacity of the N storage units.

14. The non-transitory computer-readable medium according to claim 12, wherein in the assignment of the L sets of color component data, the storage destinations of the L sets of color component data are assigned for each processing unit for which the color component image is formed.

15. The non-transitory computer-readable medium according to claim 13, wherein in the assignment of the L sets of color component data, the storage destinations of the L sets of color component data are assigned for each processing unit for which the color component image is formed.

16. A method of forming an image using I storage units, the method comprising:
    assigning to the storage units storage destinations of color component data forming a part of image data;
    forming J color component images of corresponding colors based on color component data stored in the storage units;
    forming an image of the image data based on the formed color component image, wherein in the assignment of, storage destinations of J sets of color component data forming a part of J-color image data are assigned to the I storage units and storage destinations of L sets of color component data forming a part of L-color image data are assigned to N storage units among the I storage units, and each of I, J, and N is a natural number greater than or equal to 2, L is a natural number greater than or equal to 1, L<J, and L<N≦I; and assigning the image data of one color which is included in the J-color image data or the L-color image data and which is determined in advance, to the plurality of storage units.

17. The method according to claim 16, wherein in the assignment of the L sets of color component data, the storage destinations of the L sets of color component data are dynamically assigned to the N storage units.

18. The method according to claim 16, wherein in the assignment of the L sets of color component data, the storage destinations of the L sets of color component data are assigned based on an empty capacity of the N storage units.

19. The method according to claim 17, wherein in the assignment of the L sets of color component data, the storage destinations of the L sets of color component data are assigned based on an empty capacity of the N storage units.

20. The method according to claim 18, wherein in the assignment of the L sets of color component data, the storage destinations of the L sets of color component data are assigned for each processing unit for which the color component image is formed.

21. An image formation system comprising:
I storage units;
an assignment unit that assigns storage destinations of color component data forming a part of image data to the respective storage units;
J color component image formation units that form color component images of corresponding colors based on color component data stored in the storage units; and
an image formation unit that forms an image of the image data based on the formed color component image, wherein the assignment unit comprises a J-color assignment unit that assigns storage destinations of J sets of color component data forming a part of J-color image data to the I storage units and an L-color assignment unit that assigns a storage destination of L sets of color component data forming a part of L-color image data to N storage units among the I storage units, and each of I, J, and N is a natural number greater than or equal to 2, L is a natural number greater than or equal to 1, L<J, and L<N≦I;

wherein the L-color assignment unit assigns the storage destinations of the L sets of color component data based on an empty capacity of the N storage units.

22. A non-transitory computer-readable medium storing a program causing a computer which has I storage units to execute a process for image formation, the process comprising:
assigning to respective storage units storage destinations of color component data forming a part of image data;
forming J color component images of corresponding colors based on color component data stored in the storage units; and
forming an image of the image data based on the formed color component image, wherein in the assignment, storage destinations of J sets of color component data forming a part of J-color image data are assigned to the I storage units and a storage destination of L sets of color component data forming a part of L-color image data are assigned to N storage units among the I storage units, and each of I, J, and N is a natural number greater than or equal to 2, L is a natural number greater than or equal to 1, L<J, and L<N≦I;
wherein in the assignment of the L sets of color component data, the storage destinations of the L sets of color component data are assigned based on an empty capacity of the N storage units.

23. A method of forming an image using I storage units, the method comprising:
assigning to the storage units storage destinations of color component data forming a part of image data;
forming J color component images of corresponding colors based on color component data stored in the storage units; and
forming an image of the image data based on the formed color component image, wherein in the assignment of, storage destinations of J sets of color component data forming a part of J-color image data are assigned to the I storage units and storage destinations of L sets of color component data forming a part of L-color image data are assigned to N storage units among the I storage units, and each of I, J, and N is a natural number greater than or equal to 2, L is a natural number greater than or equal to 1, L<J, and L<N≦I;
wherein in the assignment of the L sets of color component data, the storage destinations of the L sets of color component data are assigned based on an empty capacity of the N storage units.

* * * * *